US008049476B2

(12) United States Patent
Schiff

(10) Patent No.: US 8,049,476 B2
(45) Date of Patent: Nov. 1, 2011

(54) METHOD FOR CHANGING AN OUTPUT VOLTAGE AND CIRCUIT THEREFOR

(75) Inventor: Tod Schiff, Portland, OR (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 0 days.

(21) Appl. No.: 12/336,725

(22) Filed: Dec. 17, 2008

(65) Prior Publication Data

US 2010/0148738 A1 Jun. 17, 2010

(51) Int. Cl.
*G05F 1/00* (2006.01)

(52) U.S. Cl. ........................................ 323/282

(58) Field of Classification Search .................. 323/222, 323/282, 351, 266, 284; 363/15, 124; 330/297; 327/543

See application file for complete search history.

(56) References Cited

U.S. PATENT DOCUMENTS

| | | | | |
|---|---|---|---|---|
| 4,791,348 | A * | 12/1988 | McGuire et al. | 323/263 |
| 5,530,399 | A * | 6/1996 | Chambers et al. | 327/561 |
| 5,990,751 | A * | 11/1999 | Takita | 330/297 |
| 6,121,761 | A * | 9/2000 | Herbert | 323/282 |
| 6,531,853 | B2 * | 3/2003 | Umemoto | 323/282 |
| 6,680,604 | B2 * | 1/2004 | Muratov et al. | 323/285 |
| 6,798,180 | B2 * | 9/2004 | Sase et al. | 323/282 |
| 6,850,398 | B2 * | 2/2005 | Ciancio | 361/93.1 |
| 6,879,137 | B2 * | 4/2005 | Sase et al. | 323/282 |
| 7,084,613 | B2 * | 8/2006 | Harris et al. | 323/272 |
| 7,091,705 | B2 * | 8/2006 | Hoshino et al. | 323/222 |
| 7,202,646 | B2 * | 4/2007 | Vinciarelli | 323/266 |
| 7,221,129 | B2 * | 5/2007 | Matsuo et al. | 323/222 |
| 7,304,462 | B2 * | 12/2007 | Shvarts | 323/284 |
| 7,489,119 | B2 * | 2/2009 | Smith et al. | 323/283 |
| 7,724,077 | B2 * | 5/2010 | Bien | 327/543 |
| 7,852,053 | B2 | 12/2010 | Martin et al. | |
| 7,937,563 | B2 | 5/2011 | Naffziger et al. | |
| 7,954,000 | B2 | 5/2011 | Allen et al. | |
| 7,956,590 | B2 | 6/2011 | Zafarana et al. | |
| 7,960,956 | B2 | 6/2011 | Zafarana | |
| 2005/0127881 | A1 * | 6/2005 | Sase et al. | 323/225 |
| 2009/0015217 | A1 * | 1/2009 | Harriman | 323/266 |
| 2010/0085098 | A1 * | 4/2010 | Ferguson | 327/264 |

* cited by examiner

*Primary Examiner* — Adolf Berhane
*Assistant Examiner* — Yemane Mehari
(74) *Attorney, Agent, or Firm* — Rennie William Dover

(57) ABSTRACT

A power supply and a method for compensating for a droop component in an output signal of the power supply. The power supply may include an error amplifier and an oscillator coupled to a pulse width modulation circuit. Outputs of the pulse width modulation circuit are connected to switching circuits that have outputs coupled to an output node. The power supply further includes a droop compensation circuit connected to the output of the power supply, the outputs of the switching circuits, and to an input of the error amplifier. The droop compensation circuit includes an amplifier coupled to a feed-forward network and a current source coupled to the feed-forward network. The current source sources a current to or sinks a current from the feed-forward network to generate a droop compensation signal that is transmitted to the error amplifier. The current source may be controlled by a digital-to-analog circuit.

22 Claims, 5 Drawing Sheets

50
ERROR AMPLIFIER
OSCILLATOR
PWM CIRCUIT
SWITCHING STAGE
LOAD
D/A CONVERTER

150
INDUCTOR CURRENT (IL_n)
20.00
15.00
10.00
5.00
0.00
-5.00
-10.00
IL_n
OUTPUT VOLTAGE (V_OUT)
1.20
1.10
1.00
0.90
0.80
DROOP VOLTAGE (V_DRPCMP)
40.00mV
30.00mV
20.00mV
10.00mV
0.00mV
-10.00mV
V_DRPCMP
V_DRP
t_0
t_1
t_2
t_3
t_4
TIME (SEC.)

200
LOAD
SWITCHING STAGE
PWM CIRCUIT
OSCILLATOR
ERROR AMPLIFIER

METHOD FOR CHANGING AN OUTPUT VOLTAGE AND CIRCUIT THEREFOR

TECHNICAL FIELD

This invention relates, in general, to power supplies and, more particularly, to the output response of power supplies.

BACKGROUND

Power supplies are used in a variety of electronic products including automotive, aviation, telecommunications, consumer electronics, portable electronic products such as laptop computers, personal digital assistants, pagers, cellular phones, etc. Generally power supplies are categorized as linear power supplies or switching power supplies. Linear power supplies are less complex than switching power supplies; however, they are typically larger, heavier, and less efficient than switching power supplies. FIG. 1 is a circuit schematic of a typical buck switching power supply 10 that includes a modulator 12, a switch control circuit 14, switching power transistors 16 and 18, diodes 17 and 19, and an error amplifier 20. Switching power transistors 16 and 18 deliver power to a load 22 through inductors 24 and 26, respectively. In operation, switch control circuit 14 generates switching signals that turn transistors 16 and 18 on and off to form output signals having a variable duty cycle that are transmitted through inductors 24 and 26 to a load 22 to generate the desired output voltage, $V_{OUT}$.

Switching power supplies are used to provide power to processors such as central processing units and graphical processing units, thus it is desirable that they be able to increase or decrease their output voltages with fast slew rates. Switching power supplies may include Adaptive Voltage Positioning ("AVP") control schemes to further enhance the thermal performance of the switching power supplies and their loads. In switching power supplies that use AVP control, the output voltage is designed to droop linearly with increasing current and typically a droop amplifier is used for measuring the output current and controlling the output droop voltage. The slewing of the output in combination with the AVP control scheme slows the rate at which the output voltage changes because of the output capacitance charge or discharge current that is present in a droop amplifier. The droop signal causes the output voltage to position itself either lower or higher for charging or discharging the output when the voltage regulator is being changed to a higher or lower output voltage, respectively, thereby slowing the output response. One technique for increasing the output voltage slew rate in switching power supplies that use AVP control techniques is to include an error signal that compensates for the droop signal that slows or decreases the output slew rate. A drawback with this approach to increasing the slew rate is that including the error signal fails to address the root cause for the slowing of slew rate and it increases the complexity and area of the circuit design.

Accordingly, it would be advantageous to have a method and circuit for increasing the slew rate of a power supply or removing the slowing effect that the AVP droop signal has on the output slew rate. In addition, it is desirable for the method and circuit to be cost and time efficient to implement.

BRIEF DESCRIPTION OF THE DRAWINGS

The present invention will be better understood from a reading of the following detailed description, taken in conjunction with the accompanying drawing figures, in which like reference characters designate like elements and in which.

DETAILED DESCRIPTION

Figure 1:
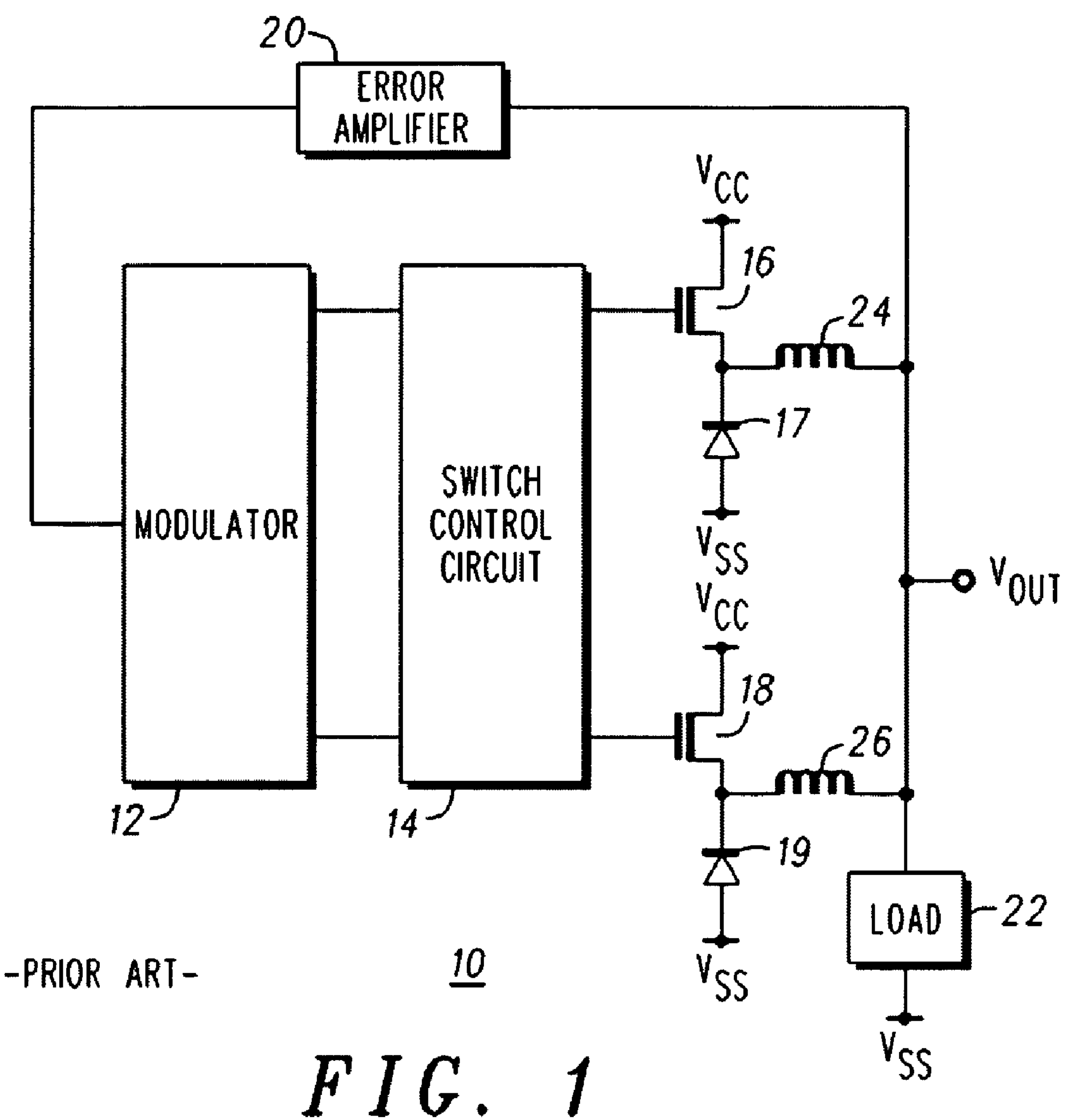
FIG. 1 is a prior art schematic diagram of a power supply.
Figure 2:
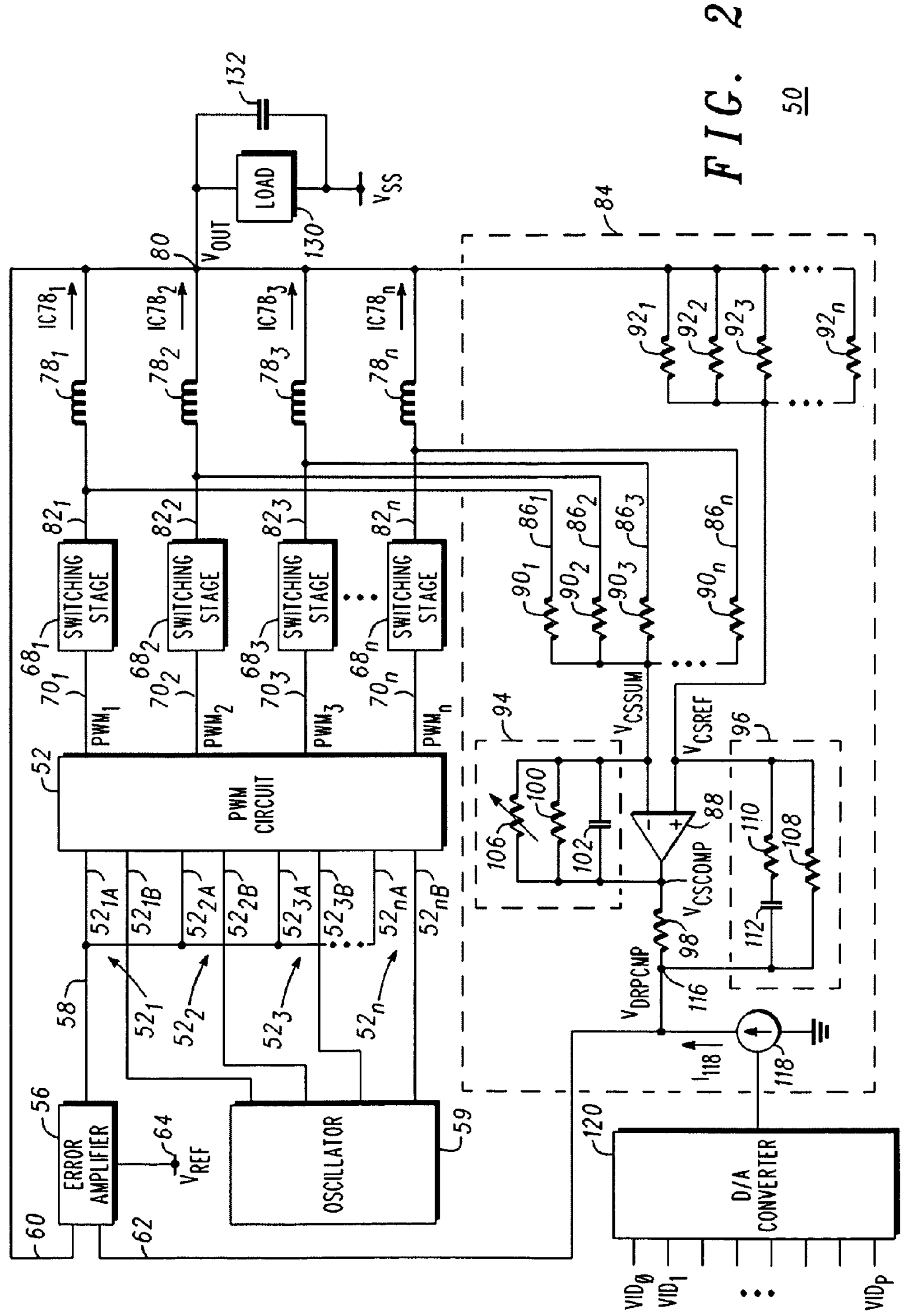
FIG. 2 is a schematic diagram of a portion of a power supply in accordance with an embodiment of the present invention.
Figure 3:
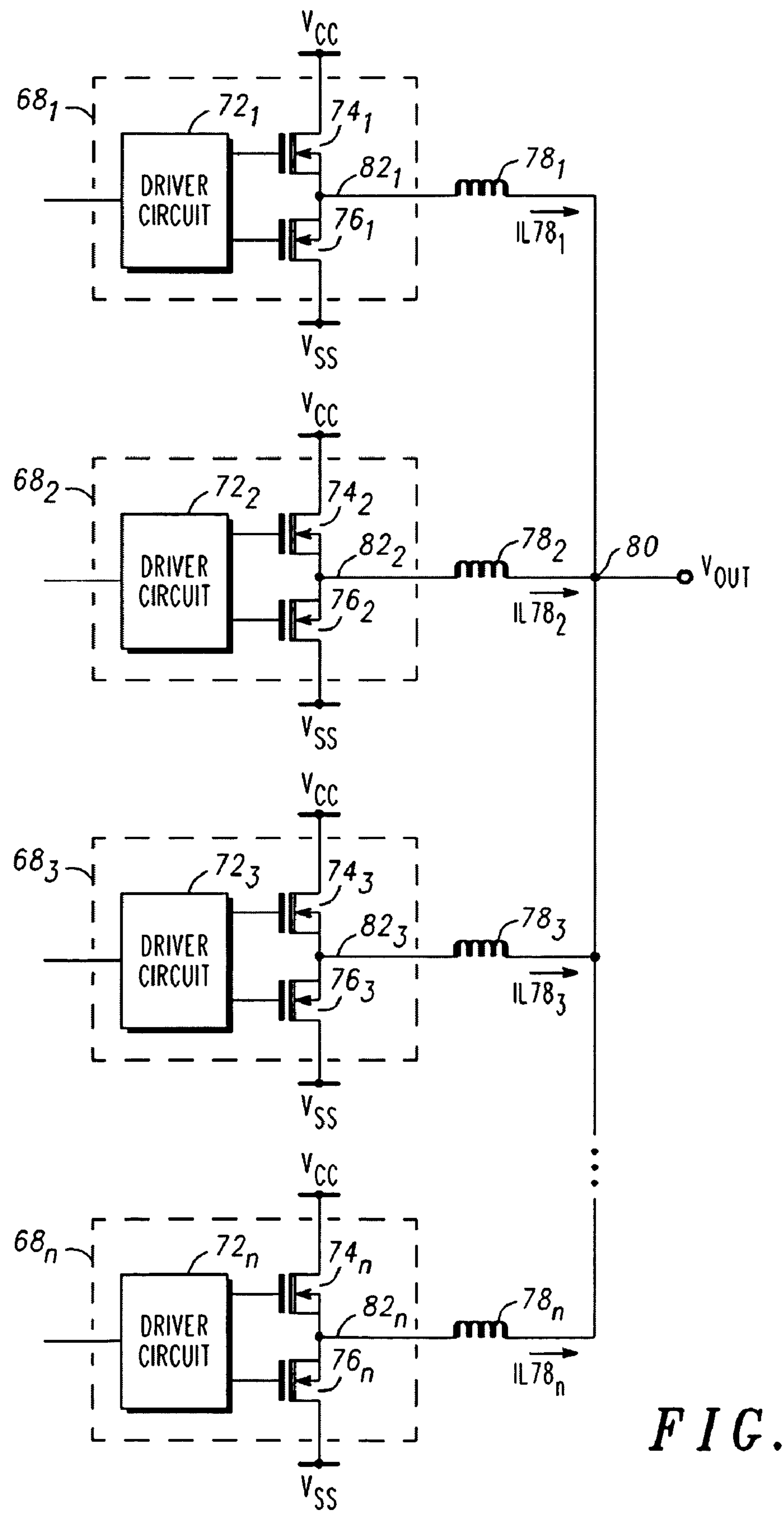
FIG. 3 is a schematic diagram of switching stages of the power supply of FIG. 2.

FIG. 2 is a schematic diagram of a power supply 50 manufactured in a semiconductor substrate in accordance with an embodiment of the present invention. FIG. 3 is a block diagram of an embodiment of switching stages $\mathbf{68}_1$, $\mathbf{68}_2$, $\mathbf{68}_3$, . . . , $\mathbf{68}_n$ and energy storage elements $\mathbf{78}_1$, $\mathbf{78}_2$, $\mathbf{78}_3$, . . . , $\mathbf{78}_n$ of power supply 50. It should be noted that FIGS. 2 and 3 will be described together. What is shown in FIG. 2 is a Pulse Width Modulator ("PWM") circuit 52 having "n" sets of inputs $\mathbf{52}_1$, $\mathbf{52}_2$, $\mathbf{52}_3$, . . . , $\mathbf{52}_n$. Each of the "n" sets of inputs comprises an error input $\mathbf{52}_{nA}$ and an oscillator input $\mathbf{52}_{nB}$. The letters "A" and "B" are used in the reference characters to distinguish between error inputs and oscillator inputs, respectively. Thus, input $\mathbf{52}_1$ comprises an error input $\mathbf{52}_{1A}$ and an oscillator input $\mathbf{52}_{1B}$; input $\mathbf{52}_2$ comprises an error input $\mathbf{52}_{2A}$ and an oscillator input $\mathbf{52}_{2B}$; input $\mathbf{52}_3$ comprises an error input $\mathbf{52}_{3A}$, and an oscillator input $\mathbf{52}_{3B}$; and input $\mathbf{52}_n$ comprises an error input $\mathbf{52}_{nA}$ and an oscillator input $\mathbf{52}_{nB}$.

Multi-phase power converter 50 further includes an error amplifier 56 having an output 58 connected to error inputs $\mathbf{52}_{1A}$, $\mathbf{52}_{2A}$, $\mathbf{52}_{3A}$, . . . , $\mathbf{52}_{nA}$ and an oscillator 59 having a plurality of outputs connected to corresponding pulse width modulator inputs $\mathbf{52}_{1B}$, $\mathbf{52}_{2B}$, $\mathbf{52}_{3B}$, . . . , $\mathbf{52}_{nB}$. Error amplifier 56 has an input 60 connected to an output node 80 of power supply 50, an input 62 coupled for receiving a droop compensation signal $V_{DRPCMP}$, and an input 64 coupled for receiving a reference voltage $V_{REF}$. It should be understood that the configuration of error amplifier 56 is not a limitation of the present invention.

PWM circuit 52 is coupled to switching stages $\mathbf{68}_1$, $\mathbf{68}_2$, $\mathbf{68}_3$, . . . , $\mathbf{68}_n$ through PWM outputs $\mathbf{70}_1$, $\mathbf{70}_2$, $\mathbf{70}_3$, . . . , $\mathbf{70}_n$, respectively. Switching stages $\mathbf{68}_1$, $\mathbf{68}_2$, $\mathbf{68}_3$, . . . , $\mathbf{68}_n$ comprise driver circuits $\mathbf{72}_1$, $\mathbf{72}_2$, $\mathbf{72}_3$, . . . , $\mathbf{72}_n$, respectively, having inputs that serve as the inputs of switching stages $\mathbf{68}_1$, $\mathbf{68}_2$, $\mathbf{68}_3$, . . . , $\mathbf{68}_n$, high-side driver outputs connected to the gates of the respective switching transistors $\mathbf{74}_1$, $\mathbf{74}_2$, $\mathbf{74}_3$, . . . , $\mathbf{74}_n$, and low-side driver outputs connected to the gates of the respective switching transistors $\mathbf{76}_1$, $\mathbf{76}_2$, $\mathbf{76}_3$, . . . , $\mathbf{76}_n$. The drains of high-side switching transistors $\mathbf{74}_1$, $\mathbf{74}_2$, $\mathbf{74}_3$, . . . , $\mathbf{74}_n$ are coupled for receiving a source of operating potential such as, for example, $V_{CC}$, and the sources of high-side switching transistors $\mathbf{74}_1$, $\mathbf{74}_2$, $\mathbf{74}_3$, . . . , $\mathbf{74}_n$ are connected to the respective drains of low-side switching transistors $\mathbf{76}_1$, $\mathbf{76}_2$, $\mathbf{76}_3$, . . . , $\mathbf{76}_n$. The sources of low-side switching transistors $\mathbf{76}_1$, $\mathbf{76}_2$, $\mathbf{76}_3$, . . . , $\mathbf{76}_n$ are coupled for receiving a source of operating potential such as, for example, $V_{SS}$. The commonly connected sources and drains of transistors $\mathbf{74}_1$, $\mathbf{74}_2$, $\mathbf{74}_3$, . . . , $\mathbf{74}_n$ and transistors $\mathbf{76}_1$, $\mathbf{76}_2$, $\mathbf{76}_3$, . . . , $\mathbf{76}_n$, respectively, are connected to terminals of the respective energy storage elements $\mathbf{78}_1$, $\mathbf{78}_2$, $\mathbf{78}_3$, . . . , $\mathbf{78}_n$. The other terminals of energy storage elements $78_1$, $78_2$, $78_3$, . . . , $78_n$ are connected together to form output node 80, which serves as an output of power supply 50. By way of example, energy storage elements $78_1$, $78_2$, $78_3$, . . . , $78_n$ are inductors.

Outputs $82_1$, $82_2$, $82_3$, . . . , $82_n$ of switching stages $68_1$, $68_2$, $68_3$, . . . , $68_n$ are connected to output node 80 via energy storage elements $78_1$, $78_2$, $78_3$, . . . , $78_n$, respectively. Currents IL$78_1$, IL$78_2$, IL$78_3$, . . . , IL$78_n$ flow through the respective energy storage elements $78_1$, $78_2$, $78_3$, . . . , $78_n$ into output node 80 at which an output voltage $V_{OUT}$ appears. In addition, outputs $82_1$, $82_2$, $82_3$, . . . , $82_n$ of switching stages $68_1$, $68_2$, $68_3$, . . . , $68_n$ are connected to inputs $86_1$, $86_2$, $86_3$, . . . , $86_n$, respectively, of a droop compensation circuit 84. In accordance with embodiments of the present invention, droop compensation circuit 84 comprises a gain stage such as, for example, an amplifier 88 having an inverting input, a non-inverting input, and an output, where the inverting input is coupled to outputs $82_1$, $82_2$, $82_3$, . . . , $82_n$ through sense resistors $90_1$, $90_2$, $90_3$, . . . , $90_n$, respectively, and the non-inverting input is coupled to output node 80 through reference resistors $92_1$, $92_2$, $92_3$, . . . , $92_n$. Amplifier 88 is also referred to as a droop amplifier. The inverting input of amplifier 88 is coupled to the output of amplifier 88 through a feedback network 94 and the non-inverting input of amplifier 88 is coupled to the output of amplifier 88 through a feed-forward network 96 and a resistor 98. In accordance with an embodiment of the present invention, feedback network 94 comprises a resistor 100, a capacitor 102, and a variable resistance resistor 106 coupled in a parallel configuration and feed-forward network 96 comprises a resistor 108 coupled in parallel with a series connected resistor 110 and capacitor 112. One terminal of feed-forward network 96 is connected to the non-inverting input of amplifier 88 and the other terminal is coupled to the output of amplifier 88 through resistor 98.

Droop compensation circuit 84 further includes a current source 118 having a terminal connected to terminals of resistors 98 and 108 and capacitor 112 to form a node 116. Preferably current source 118 is a controlled current source. By way of example, a digital-to-analog circuit ("DAC") 120 has an output coupled to a control input of current source 118. DAC 120 has inputs $VID_0$, $VID_1$, . . . , $VID_p$ coupled for receiving voltage identification signals from, for example, a microprocessor, where p is an integer. Input 62 of error amplifier 56 is connected to node 116 of droop compensation circuit 84.

A load 130 is coupled between output node 80 and a source of operating potential such as, for example, $V_{SS}$. An output capacitor 132 is connected in parallel with load 130. Output node 80 is connected in a feedback configuration to error amplifier 56.

In operation, amplifier 88, feedback network 94, and feed-forward network 96 generate a current sense compensation voltage $V_{CSCOMP}$ at the output of amplifier 88. In addition, DAC 120 receives voltage identification codes at inputs $VID_0$, $VID_1$, . . . , $VID_p$ from, for example, a microprocessor and transmits a control signal or current control signal to controlled current source 118. In response to the control signal from DAC 120, controlled current source 118 injects a current $I_{118}$ into node 116. Preferably, current $I_{118}$ is injected in stepped increments for predetermined periods of time in accordance with the voltage change in DAC 120. For example, current $I_{118}$ may be sourced or sinked in 66 microampere (μA) increments for time periods of 167 nanoseconds (nsec) for each 5 millivolt (mV) change in DAC 120. Thus, for the first 5 mV change in DAC 120, current source $I_{118}$ sources or sinks 66 μA for 167 nsec; for a second 5 mV change in DAC 120, current source $I_{118}$ sources or sinks an additional 66 μA for 167 nsec; for a third 5 mV change in DAC 120, current source $I_{118}$ sources or sinks an additional 66 μA for 167 nsec, etc. In accordance with this example, current source $I_{118}$ sources or sinks 66 μA for 167 nsec, then it sources or sinks 132 μA for the next 167 nsec, then it sources or sinks 198 μA for the next 167 nsec, etc. Current $I_{118}$ flows through feed-forward network 96 to form a feed-forward signal that, in combination with current sense compensation signal $V_{CSCOMP}$, generates a droop voltage compensation signal $V_{DRPCMP}$ at node 116. Droop voltage compensation signal $V_{DRPCMP}$, also referred to as a droop compensation signal, is transmitted to input 62 of error amplifier 56, which generates an error signal from droop voltage compensation signal $V_{DRPCMP}$, output voltage $V_{OUT}$, and a reference voltage $V_{REF}$. PWM circuit 12 receives the error signal from error amplifier 56 and input signals from oscillator 59 and generates pulse width modulation signals $PWM_1$, $PWM_2$, $PWM_3$, . . . , $PWM_n$ at PWM outputs $70_1$, $70_2$, $70_3$, . . . , $70_n$ which drive switching stages $68_1$, $68_2$, $68_3$, . . . , $68_n$ to generate voltages at outputs $82_1$, $82_2$, $82_3$, . . . , $82_n$, respectively. In response to the voltages at outputs $82_1$, $82_2$, $82_3$, . . . , $82_n$, a voltage $V_{CSSUM}$ appears at the inverting input of amplifier 88 and in response to output voltage $V_{OUT}$ a current sense reference voltage $V_{CSREF}$ appears at the non-inverting input of amplifier 88. The input signals at the inverting and non-inverting inputs of amplifier 88 in combination with feedback network 94 and feed-forward network 96 cause amplifier 88 to generate current sense compensation voltage $V_{CSCOMP}$ at its output as discussed above.

Figure 4:
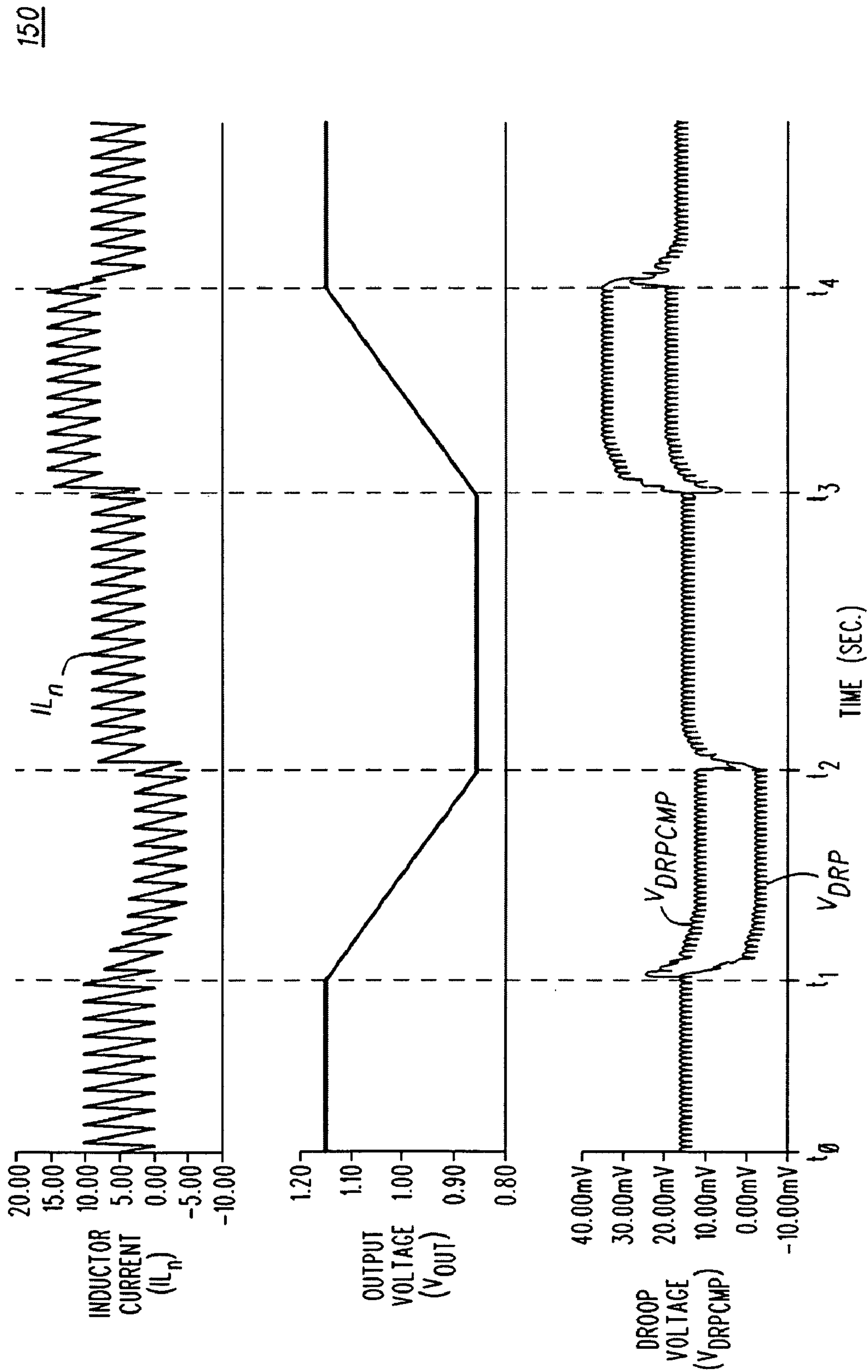
FIG. 4 is a timing diagram of voltage and current waveforms of a power supply in accordance with an embodiment of the present invention.

FIG. 4 is an output diagram 150 illustrating inductor current $IL_n$, output voltage $V_{OUT}$, and the voltages $V_{DRPCMP}$ and $V_{DRP}$ at node 116 for compensated and uncompensated droop signals, respectively. Although there are "n" inductor waveforms, for the sake of clarity a waveform from a single inductor has been shown in FIG. 4 that represents inductor currents IL$78_1$, IL$78_2$, IL$78_3$, . . . , IL$78_n$. The number of phases is not a limitation of the present invention. Power supply 50 can be comprised of a single-phase power converter (n=1), a two-phase power converter (n=2), a three-phase power converter (n=3), a four-phase power converter (n=4), etc. As discussed above, pulse width modulator circuit 52 generates pulse width modulated signals $PWM_1$, $PWM_2$, $PWM_3$, . . . , $PWM_n$ at PWM outputs $70_1$, $70_2$, $70_3$, . . . , $70_n$, respectively, that are input to switching stages $68_1$, $68_2$, $68_3$, . . . , $68_n$ which generate inductor currents IL$78_1$, IL$78_2$, IL$78_3$, . . . , IL$78_n$ that flow through the respective inductors $78_1$, $78_2$, $78_3$, . . . , $78_n$. Inductor currents IL$78_1$, IL$78_2$, IL$78_3$, . . . , IL$78_n$ are summed at output node 80 and transmitted through load 130 and output capacitor 132.

FIG. 4 illustrates an inductor current IL$78_n$ generated by switching stage $68_n$ in response to pulse width modulation signal $PWM_n$. As discussed above, typically there is a plurality of inductor currents but for the sake of clarity a single inductor current is shown that represents a composite of inductor currents IL$78_1$, IL$78_2$, IL$78_3$, . . . , IL$78_n$. FIG. 4 further illustrates output voltage $V_{OUT}$ appearing at output node 80. During the time interval from about time $t_1$ to about time $t_2$, DAC 120 is controlled to reduce output voltage $V_{OUT}$ at output node 80 by decreasing inductor currents IL$78_1$, IL$78_2$, IL$78_3$, . . . , IL$78_n$ which discharges output capacitance 132 thereby causing output voltage $V_{OUT}$ to decrease. During the time interval from about time $t_2$ to about time $t_3$, DAC 120 is controlled to maintain a constant output voltage $V_{OUT}$ at output node 80 which causes inductor currents IL$78_1$, IL$78_2$, IL$78_3$, . . . , IL$78_n$ to stabilize at a nominal value and output voltage $V_{OUT}$ to stabilize at the new DAC level. During the time interval from about time $t_3$ to about time $t_4$, DAC 120 is controlled to increase output voltage $V_{OUT}$ at output node 80 which causes inductor currents $IL78_1$, $IL78_2$, $IL78_3$, . . . , $IL78_n$ to increase thereby charging output capacitance 132 and increasing output voltage $V_{OUT}$. During the time interval from about time $t_4$ to about time $t_5$, DAC 120 is controlled to maintain the output voltage $V_{OUT}$ at output node 80 which causes inductor currents $IL78_1$, $IL78_2$, $IL78_3$, . . . , $IL78_n$ to stabilize at a nominal value and output voltage $V_{OUT}$ to stabilize at the new DAC level.

This charge and discharge current in inductors $IL78_1$, $IL78_2$, $IL78_3$, . . . , $IL78_n$ generates a signal in droop amplifier 88 that slows down the change in output voltage $V_{OUT}$. Thus, sourcing or sinking current $I_{118}$ into the droop signal to remove this component of the droop signal creates a droop signal that does not include the charge or discharge droop signal from the charging and discharging of the output capacitor and improves the response of the output voltage change for a change in the DAC control. Components 98, 108, 110, and 112 are used along with current signal $I_{118}$ to remove from signal $V_{DRP}$ the signal due to the charging and discharging of output capacitance 132 to give a droop feed-forward compensated signal $V_{DRPCMP}$ that is then used as an input control signal to error amplifier 56. Additionally, current source I118 can be controlled such that the amount of correction to the signal $V_{DRP}$ is independent of the rate of change (slew-rate) at which output voltage $V_{OUT}$ changes.

Figure 5:
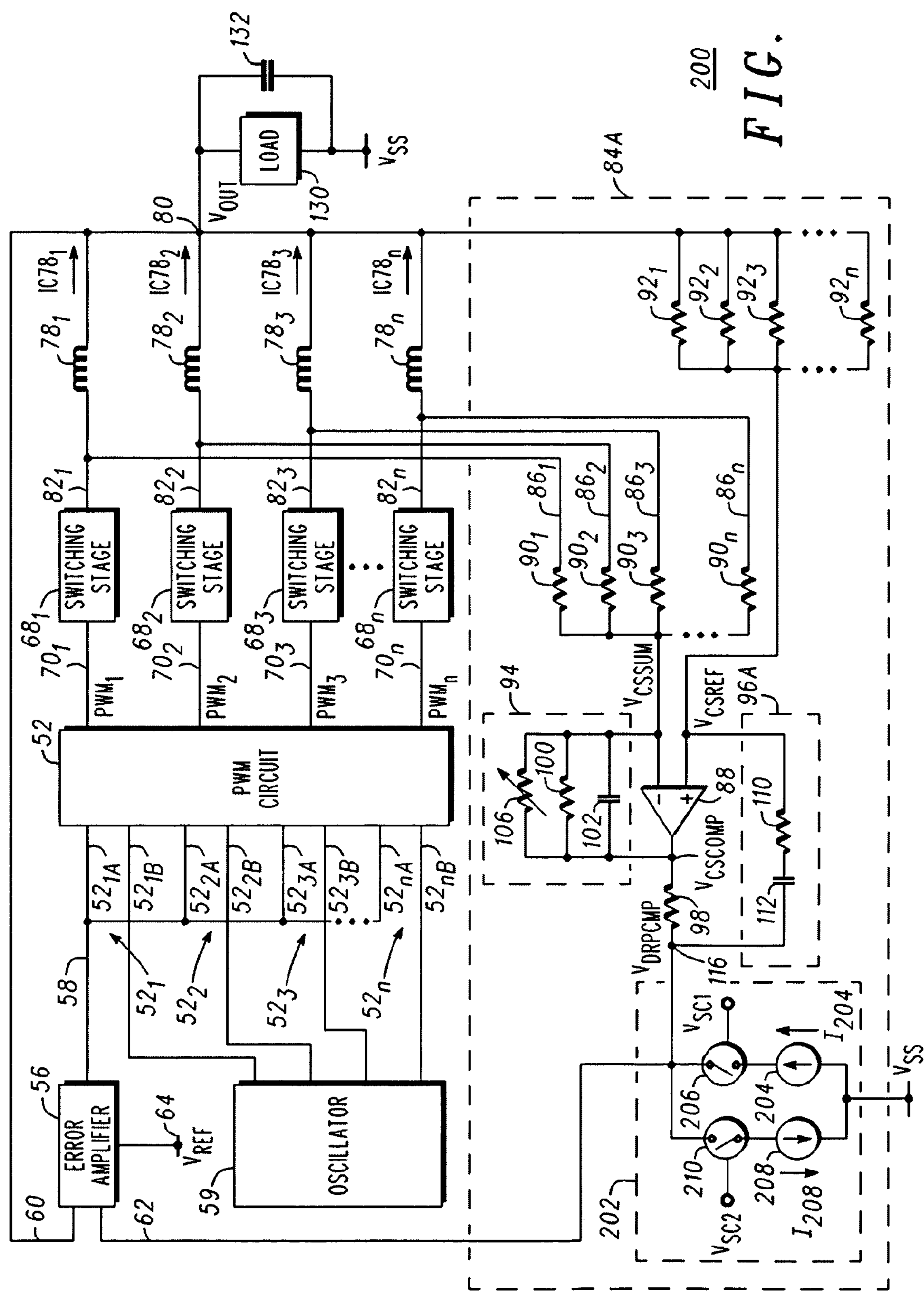
FIG. 5 is a schematic diagram of a portion of a power supply in accordance with another embodiment of the present invention.

FIG. 5 is a circuit schematic of a power supply 200 manufactured in a semiconductor substrate in accordance with another embodiment of the present invention. Power supply 200 includes PWM circuit 52, error amplifier 56, oscillator 59, switching stages $68_1$, $68_2$, $68_3$, . . . , $68_n$, inductors $78_1$, $78_2$, $78_3$, . . . , $78_n$, and a droop compensation circuit 84A which is comprised of amplifier 88, a feed-forward network 96A, feedback network 94, the resistor network comprising resistors $90_1$, $90_2$, $90_3$, . . . , $90_n$, and the resistor network comprising resistors $92_1$, $92_2$, $92_3$, . . . , $92_n$. In addition, droop compensation circuit 84A includes a switching current network 202 that comprises a current source 204 coupled to node 116 by a switch 206, a current source 208 coupled to node 116 by a switch 210, resistor 98, and a series connected resistor 110 and capacitor 112 coupled between node 116 and the non-inverting input of amplifier 88. The values of resistor 98 and capacitor 112 of power supply 200 can be selected in accordance with equation 1 (EQT. 1) and equation 2 (EQT. 2):

$$I_{204}*R_{98}=R_{DROOP}*C_{132}*dVID_n/dt \quad \text{EQT. 1}$$

$$5*R_{98}*C_{112}=2.2*R_{DROOP}*C_{132} \quad \text{EQT. 2}$$

where:

$I_{204}$ is the current sourced by current source 204 (Amperes);

$R_{98}$ is the resistance value of resistor 98 (Ohms);

$R_{DROOP}$ is the droop resistance of the voltage regulator design and is typically specified for the load which may be a CPU (Ohms);

$C_{132}$ is the output capacitance (Farads);

dV is the change in voltage for the DAC signal (Volts/second); and $C_{112}$ is the capacitance value for capacitor 112 (Farads).

In operation, amplifier 88, feedback network 94, and feed-forward network 96A generate a current sense compensation voltage $V_{CSCOMP}$ at its output. In addition, a current $I_{204}$ is injected or sourced into node 116 or a current $I_{208}$ is transmitted or sunk from node 116 in accordance with the configuration of switches 206 and 210. For example, setting switch control signal $V_{SC1}$ at a logic high voltage and switch control signal $V_{SC2}$ at a logic low voltage closes switch 206 and opens switch 210. In this configuration, current source 204 is connected to node 116 and current source 208 is disconnected from node 116. Thus, current $I_{204}$ is injected into node 116. It should be noted that switch control signals $V_{SC1}$ and $V_{SC2}$ may be derived from a microprocessor, a logic circuit, or the like. Current $I_{204}$ flows through feed-forward network 96A to form a feed-forward signal that, in combination with current sense compensation signal $V_{CSCOMP}$, generates a droop voltage compensation signal $V_{DRPCMP}$ at node 116. Droop voltage compensation signal $V_{DRPCMP}$ is transmitted to input 62 of error amplifier 56, which generates an error signal from droop voltage compensation signal $V_{DRPCMP}$, output voltage $V_{OUT}$, and a reference voltage $V_{REF}$. PWM circuit 52 receives an error signal from error amplifier 56 and input signals from oscillator 59 and generates pulse width modulation signals $PWM_1$, $PWM_2$, $PWM_3$, . . . , $PWM_n$, which drive switching stages $68_1$, $68_2$, $68_3$, . . . , $68_n$ to generate voltages at outputs $82_1$, $82_2$, $82_3$, . . . , $82_n$. Droop voltage compensation signal $V_{DRPCMP}$ has been compensated to remove the charge or discharge current signal from output capacitance 132 to increase the slew rate of output voltage $V_{OUT}$, independent of the output voltage change slew-rate or the amount of output capacitance. In response to the voltages at outputs $82_1$, $82_2$, $82_3$, . . . , $82_n$, a voltage $V_{CSSUM}$ appears at the inverting input of amplifier 88 and in response to output voltage $V_{OUT}$ a current sense reference voltage $V_{CSREF}$ appears at the non-inverting input of amplifier 88. The input signals at the inverting and non-inverting inputs of amplifier 88 in combination with feedback network 94 and feed-forward network 96A cause amplifier 88 to generate current sense compensation voltage $V_{CSCOMP}$ at its output as discussed above.

Alternatively, switches 206 and 210 can be configured to sink current $I_{208}$ from node 116 by setting switch control signal $V_{SC1}$ at a logic low voltage and switch control signal $V_{SC2}$ at a logic high voltage thereby opening switch 206 and closing switch 210. In this configuration, current source 208 is connected to node 116 and current source 204 is disconnected from node 116. Thus, current $I_{208}$ is sunk from node 116. Current $I_{208}$ flows through feed-forward network 96A to form a feed-forward signal that, in combination with current sense compensation signal $V_{CSCOMP}$, generates a droop voltage compensation signal $V_{DRPCMP}$ at node 116. Droop voltage compensation signal $V_{DRPCMP}$ is transmitted to input 62 of error amplifier 56, which generates an error signal from droop voltage compensation signal $V_{DRPCMP}$, output voltage $V_{OUT}$, and a reference voltage $V_{REF}$. PWM circuit 52 receives an error signal from error amplifier 56 and input signals from oscillator 59 and generates pulse width modulation signals $PWM_1$, $PWM_2$, $PWM_3$, . . . , $PWM_n$, which drive switching stages $68_1$, $68_2$, $68_3$, . . . , $68_n$ to generate voltages at outputs $82_1$, $82_2$, $82_3$, . . . , $82_n$. In response to the voltages at outputs $82_1$, $82_2$, $82_3$, . . . , $82_n$, a voltage $V_{CSSUM}$ appears at the inverting input of amplifier 88 and in response to output voltage $V_{OUT}$ a current sense reference voltage $V_{CSREF}$ appears at the non-inverting input of amplifier 88. The input signals at the inverting and non-inverting inputs of amplifier 88 in combination with feedback network 94 and feed-forward network 96A cause amplifier 88 to generate current sense compensation voltage $V_{CSCOMP}$ at its output as discussed above.

It should be noted that timing diagram 150 applies to both power supplies 50 and 200.

By now it should be appreciated that a power supply and a method for changing an output signal of the power supply have been provided. In accordance with embodiments of the present invention, the droop signal caused by the charging or discharging of an output capacitance during the dynamic change in the output voltage is removed from the input of an amplifier. A droop component of the output voltage signal is compensated by forming a feed-forward network into or from which a compensation current is sourced or sunk. More particularly, the compensation current is sourced or sunk into or from the feed-forward network to create a droop compensation signal that is transmitted to an error amplifier. A pulse width modulation circuit receives input signals from the error amplifier and an oscillator to generate pulse width modulated signals that create an output voltage signal having improved slewing caused by the compensated droop signal present in the feedback loop. In addition, embodiments of the present invention are suitable for use in designs to automatically compensate for slew rates in an output signal in real time or by design that are caused by different dynamic voltage identification signals. Another advantage of embodiments in accordance with the present invention is that adaptive voltage positioning can remain active for output load changes while removing the output current signal that slews the output voltage and that is present from charging or discharging the output capacitance.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method for changing an output signal level comprising using a feed-forward signal to change a droop component of the output signal, wherein using the feed-forward signal to change the droop component includes substantially removing a droop signal from an input signal to a droop amplifier.

2. The method of claim 1, wherein using the feed-forward signal to change the droop component includes decreasing the droop component.

3. The method of claim 1, wherein using the feed-forward signal to change the droop component includes removing a droop signal generated by at least one of charging or discharging a capacitor.

4. The method of claim 1, wherein using the feed-forward signal includes using current to create the feed-forward signal.

5. The method of claim 4, further including:

providing a gain stage having an input and an output;

providing a node coupled to the output of the gain stage and to the input of the gain stage; and one of sourcing or sinking the current into or from the node.

6. The method of claim 5, wherein the one of sourcing or sinking the current into or from the node includes using a controlled current source to source the current into the node.

7. The method of claim 5, further including controlling the controlled current source using voltage identification signals.

8. The method of claim 5, further including:

creating a droop compensation signal at the node in response to injecting current into the node; and transmitting the droop compensation signal at the node to an error amplifier.

9. The method of claim 6, further including controlling the current source with a digital-to-analog converter.

10. The method of claim 1, wherein changing the droop component includes increasing a slew rate of the output signal.

11. A method for changing an output voltage, comprising:

generating a feed-forward signal by one of sourcing a current to a node or sinking the current from the node in response to a control signal, wherein sourcing the current to the node comprises:

sourcing the current at a first level for a first time period; and sourcing the current at a second level for a second time period; and using the feed-forward signal to generate a droop compensation signal.

12. The method of claim 11, wherein generating the feed-forward signal comprises using one or more voltage identification signals to generate the feed-forward signal.

13. The method of claim 11, further including:

generating the feed-forward signal by sinking the current from the node in response to a control signal; and using the feed-forward signal to generate the droop compensation signal.

14. The method of claim 13, further including using the compensation signal to increase a slew rate of the output signal.

15. A power supply having an output, comprising:

a droop compensation circuit comprising:

a droop amplifier stage having an inverting input, a non-inverting input, and an output;

a feedback circuit coupled between the inverting input and the output of the droop amplifier;

a feed-forward circuit coupled between the non-inverting input and the output of the droop amplifier; and a control circuit coupled to the droop compensation circuit;

a pulse width modulation circuit having an input and an output, the input coupled to the output of the droop amplifier; and one or more switching stages coupled between the output of the pulse width modulation circuit and the inverting input and the non-inverting input of the droop amplifier.

16. The power supply of claim 15, wherein the droop compensation circuit comprises a current source having an output terminal and a control terminal, the control terminal coupled to the control circuit, the power supply further including an error amplifier having first and second inputs and an output, the first input coupled to the output terminal of the current source and to the output of the droop amplifier stage, the second input coupled to the inverting input and the non-inverting input of the droop amplifier, and the output coupled to the pulse width modulation circuit.

17. The power supply of claim 15, wherein the control circuit comprises a digital-to-analog converter coupled to the current source.

18. The power supply of claim 15, wherein the feed-forward network comprises a resistor and a capacitor coupled in series between the non-inverting input and the output of the droop amplifier.

19. A power supply having an output, comprising:

a droop compensation circuit comprising:

a droop amplifier stage having an inverting input, a non-inverting input, and an output;

a feedback circuit coupled between the inverting input and the output of the droop amplifier;

a feed-forward circuit coupled between the non-inverting input and the output of the droop amplifier; and a control circuit coupled to the droop compensation circuit;

a pulse width modulation circuit having an input and an output, the input coupled to the output of the droop amplifier, wherein the pulse width modulation circuit has a plurality of outputs and further including a plurality of switching stages coupled between the output of the pulse width modulation circuit and the inverting input and the non-inverting input of the droop amplifier, and wherein the droop compensation circuit further comprises a first plurality of resistors and a second plurality of resistors, the first plurality of resistors coupled between corresponding switching stages and the inverting input of the droop amplifier and the second plurality of resistors coupled between corresponding switching stages and the non-inverting input of the droop amplifier; and one or more switching stages coupled between the output of the pulse width modulation circuit and the inverting input and the non-inverting input of the droop amplifier.

20. The power supply of claim 19, wherein the droop compensation circuit comprises a current source.

21. The power supply of claim 19, wherein the control circuit comprises a digital-to-analog converter coupled to the current source.

22. The power supply of claim 19, wherein the feed-forward network comprises a resistor and a capacitor coupled in series between the non-inverting input and the output of the droop amplifier.

* * * * *